United States Patent
Jan et al.

(10) Patent No.: US 11,046,462 B2
(45) Date of Patent: Jun. 29, 2021

(54) SATELLITE ATTITUDE DATA FUSION SYSTEM AND METHOD THEREOF

(71) Applicant: National Applied Research Laboratories, Taipei (TW)

(72) Inventors: Ying-Wei Jan, Hsin-Chu (TW);
Ming-Yu Yeh, Hsin-Chu (TW);
Wei-Ting Wei, Hsin-Chu (TW);
Jia-Cheng Li, Hsin-Chu (TW);
Yeong-Wei Wu, Hsin-Chu (TW)

(73) Assignee: NATIONAL APPLIED RESEARCH LABORATORIES, Tapei (TW)

( * ) Notice: Subject to any disclaimer, the term of this patent is extended or adjusted under 35 U.S.C. 154(b) by 309 days.

(21) Appl. No.: 16/234,159

(22) Filed: Dec. 27, 2018

(65) Prior Publication Data
US 2020/0122863 A1    Apr. 23, 2020

(30) Foreign Application Priority Data

Oct. 18, 2018    (TW) .................................. 107136839

(51) Int. Cl.
| | |
|---|---|
| *B64G 1/24* | (2006.01) |
| *B64G 1/36* | (2006.01) |
| *B64G 1/28* | (2006.01) |
| *B64G 1/10* | (2006.01) |
| *G01C 21/02* | (2006.01) |

(52) U.S. Cl.
CPC .............. *B64G 1/24* (2013.01); *B64G 1/105* (2013.01); *B64G 1/288* (2013.01); *B64G 1/361* (2013.01); *G01C 21/025* (2013.01); *B64G 2001/1057* (2013.01); *B64G 2001/245* (2013.01)

(58) Field of Classification Search
CPC .......... B64G 1/24; B64G 1/105; B64G 1/288; B64G 1/361
See application file for complete search history.

(56) References Cited

U.S. PATENT DOCUMENTS

| | | | |
|---|---|---|---|
| 7,124,001 B2 | 10/2006 | Li et al. | |
| 2004/0098178 A1* | 5/2004 | Brady .................. | G01C 21/025 701/4 |

(Continued)

OTHER PUBLICATIONS

Romans et al., "Optimal combination of quaternions from multiple star cameras", (JPL) May 2003, 1-4.

(Continued)

*Primary Examiner* — Imran K Mustafa
(74) *Attorney, Agent, or Firm* — Muncy, Geissler, Olds & Lowe, P.C.

(57) ABSTRACT

A satellite attitude data fusion system and method is disclosed, applicable to the earth satellite environment to estimate attitude data of the satellite. When the satellite attitude data fusion system of the present invention is used to perform the satellite attitude data fusion method, the first step is to perform a body rates quaternion attitude data processing operation. Then, the next step is to perform an attitude/rates data fusion processing operation, wherein an attitude data fusion algorithm module receives the first IAE result data from the first EKF, and the second JAE result data from the second EKF, and performs an attitude/rates data fusion algorithm in a subsystem level to evaluate an attitude estimation JAE performance.

2 Claims, 5 Drawing Sheets

(56) References Cited

U.S. PATENT DOCUMENTS

2005/0010337 A1* 1/2005 Li .......................... B64G 1/36
 701/13
2015/0041595 A1* 2/2015 Hartmann ............... B64G 1/36
 244/158.8

OTHER PUBLICATIONS

Jörgenson et al., "On-the-Fly Merging of Attitude Solutions", 5$^{th}$ International Symposium of the IAA, 2006, 175-183.

* cited by examiner

| 1 sigma error | X (arcsec) | Y (arcsec) | Z (arcsec) |
|---|---|---|---|
| Case 1 | 5.46 | 37.24 | 9.53 |
| Case 2 | 4.82 | 35.91 | 8.53 |
| Case 3 | 3.84 | 25.18 | 6.49 |

FIG. 4

SATELLITE ATTITUDE DATA FUSION SYSTEM AND METHOD THEREOF

CROSS-REFERENCE TO RELATED APPLICATION

This application claims the priority of Taiwanese patent application No. 107136839, filed on Oct. 18, 2018, which is incorporated herewith by reference.

BACKGROUND OF THE INVENTION

1. Field of the Invention

The technical field generally relates to a satellite attitude data system and method, and in particular, to a satellite attitude data fusion system and method, applicable to the earth satellite environment to estimate attitude data of the satellite, by using a first EKF (Extended Kalman Filter) and a second EKF of a GS IAE (Gyro-Stellar Inertial Attitude Estimate), a sensor, a first gyro and a second gyro of an MEMS, and an attitude data fusion algorithm module to perform an attitude/rates data fusion algorithm in a subsystem level to evaluate an attitude estimation performance.

2. The Prior Arts

As for the traditional satellite attitude determination system, for example, the US Patent Application publication No. 2004/0098178 A1 discloses an integrated inertial stellar attitude sensor using a star camera system and a gyroscope system to estimate the satellite attitude, wherein the star camera system is the IAE (Inertial Attitude Estimate) system.

For the GS (Gyro-Stellar) IAE operation, the gyro is for providing the satellite angular rate to estimate the satellite attitude, and the IAE (star tracker) is for providing the value to correct the satellite attitude estimated by the gyro.

In the document, "Optimal combination of quaternions from multiple star cameras", L. Romans (JPL), May 2003, a procedure for optimally combining attitude data measured simultaneously from differently aligned star cameras, given (Gaussian) noise models was proposed. In this approach, the orientations from each star camera to the common reference frame are assumed to be known.

In the document, "On-The Fly Merging of Attitude Solutions", Peter S. Jorgensen et al, 5th International Symposium of the IAA, 2006, authors applied the method proposed by Romans to various satellite programs for merging the multiple attitude solutions.

U.S. Pat. No. 7,124,001 B2 disclosed "Relative Attitude Estimator For Multi-Payload Attitude Determination", wherein inventors disclosed a method and apparatus for estimating the relative attitude between the slave payload attitude and the master payload attitude using a relative attitude model parameter estimator. By processing the slave payload attitude and the master payload attitude, the relative attitude model parameter estimator estimates the relative attitude between a "slave channel" attitude determination sensor and a "master channel" attitude determination sensor. The relative attitude estimator output allows "slave channel" measurements to be corrected to be consistent with the "master channel" and consequently used to improve the determination of the attitude of the slave payload.

"Gyro-Stellar (GS) Inertial Attitude Estimate (IAE)" or "Stellar Inertial Attitude Determination (SIAD)" is a subsystem that combines the attitude provided by a body-mounted 3-axes gyros, and the attitude provided by a body-mounted star sensor (or multiple body-mounted star sensors) to produce a best estimate of spacecraft body attitude through the use of an Extended Kalman Filter. This art has been applied to many existing satellite Attitude and Orbit Control System (AOCS) such as NASA's GOES programs and others.

Recent advances in the construction of MEMS devices have made it possible to manufacture small and light weight inertial sensors. These advances have widened the range of possible applications in many commercial as well as military areas. However, because of its low accuracy, the devices have limited their applications to tasks requiring high-precision.

Therefore, the issues need to be addressed include how to obtain a satellite attitude data fusion system and method by using less quantity of star trackers, for example, only one star tracker, a certain quantity of gyros, for example, two gyros, and a certain quantity of Extended Kalman Filters, for example, two Extended Kalman Filters to determine a better estimation of the spacecraft attitude data, solve the low accuracy problem of small and light weight inertial sensors, for example, star trackers, of MEMS devices, and obtain high-precision satellite attitude data of the satellite attitude data fusion system and method in evaluating an attitude estimation IAE performance.

SUMMARY OF THE INVENTION

A main objective of the present invention is to provide a satellite attitude data fusion system and method, applicable to the earth satellite environment to estimate attitude data of the satellite. When the satellite attitude data fusion system of the present invention is used to perform the satellite attitude data fusion method, the first step is to perform a body rates quaternion attitude data processing operation, wherein a first EKF (Extended Kalman Filter) receives first body rates data from a first gyro, and quaternion attitude data from a sensor, and performs an first algorithm based on the first body rates data and the quaternion attitude data to obtain first IAE (Inertial Attitude Estimate) result data and output it, and wherein a second EKF (Extended Kalman Filter) receives second body rates data from a second gyro, and the quaternion attitude data from the sensor, and performs an second algorithm based on the second body rates data and the quaternion attitude data to obtain second IAE (Inertial Attitude Estimate) result data and output it. Then, the next step is to perform an attitude/rates data fusion processing operation, wherein an attitude data fusion algorithm module receives the first IAE result data from the first EKF, and the second IAE result data from the second EKF, and performs an attitude/rates data fusion algorithm in a subsystem level to evaluate an attitude estimation IAE performance.

Another objective of the present invention is to provide a satellite attitude data fusion system and method, applicable to the earth satellite environment to estimate attitude data of the satellite. The first EKF of a GS IAE (Gyro-Stellar (GS) Inertial Attitude Estimate (IAE)) receives first body rates data from the first gyro of a MEMS and sensor attitude data from a sensor, and performs an first algorithm based on the first body rates data and the sensor attitude data to obtain the first IAE (Inertial Attitude Estimate) result data and output it. The second EKF (Extended Kalman Filter) of the GS IAE (Gyro-Stellar (GS) Inertial Attitude Estimate (IAE)) receives second body rates data from a second gyro of the MEMS and the sensor attitude data from the sensor, and performs an second algorithm based on the second body rates data and the sensor attitude data to obtain second IAE (Inertial Attitude Estimate) result data and output it. An attitude/rates data fusion processing operation is performed by using the first IAE result data and the second IAE result data and performing the attitude/rates data fusion algorithm.

Yet another objective of the present invention is to provide a satellite attitude data fusion system and method, applicable to the earth satellite environment to estimate attitude data of the satellite by using less quantity of star trackers, for example, only one star tracker, a certain quantity of gyros, for example, two gyros, and a certain quantity of Extended Kalman Filters, for example, two Extended Kalman Filters to determine a better estimation of the spacecraft attitude data.

Yet another objective of the present invention is to provide a satellite attitude data fusion system and method, applicable to the earth satellite environment to estimate attitude data of the satellite to solve the low accuracy problem of small and light weight inertial sensors, for example, star trackers, of MEMS devices, and to obtain high-precision satellite attitude data of the satellite attitude data fusion system and method in evaluating an attitude estimation IAE performance.

To achieve the aforementioned objects, the present invention provides a satellite attitude data fusion system, comprising at least: a first EKF and a second EKF of a GS IAE, a sensor, a first gyro, a second gyro of a MEMS, and an attitude data fusion algorithm module.

First EKF: the first EKF of a GS IAE receives first gyro attitude data from a first gyro of a MEMS, and sensor attitude data from a sensor, and performs an first algorithm based on the first gyro attitude data and the sensor attitude data to obtain first IAE (Inertial Attitude Estimate) result data and output it to an attitude data fusion algorithm module.

Second EKF: the second EKF of the GS IAE receives second gyro attitude data from a second gyro of the MEMS, and the sensor attitude data from the sensor, and performs an second algorithm based on the second gyro attitude data and the sensor attitude data to obtain second IAE (Inertial Attitude Estimate) result data and output it to the attitude data fusion algorithm module.

Attitude data fusion algorithm module: the attitude data fusion algorithm module receives the first IAE result data and the second IAE result data, and performs an attitude/rates data fusion algorithm in a subsystem level to evaluate an attitude estimation IAE performance.

When the satellite attitude data fusion system of the present invention is used to perform the satellite attitude data fusion method, the first step is to perform a body rates/quaternion attitude data processing operation, wherein a first EKF (Extended Kalman Filter) receives first body rates data from a first gyro, and quaternion attitude data from a sensor, and performs an first algorithm based on the first body rates data and the quaternion attitude data to obtain first IAE (Inertial Attitude Estimate) result data and output it to an attitude data fusion algorithm module, and the first body rates data is first gyro attitude data and the quaternion attitude data is sensor attitude data of the sensor, and wherein a second EKF (Extended Kalman Filter) receives second body rates data from a second gyro, and the quaternion attitude data from the sensor, and performs an second algorithm based on the second body rates data and the quaternion attitude data to obtain second IAE (Inertial Attitude Estimate) result data and output it to the attitude data fusion algorithm module, and the second body rates data is second gyro attitude data and the quaternion attitude data is sensor attitude data of the sensor.

Then, the next step is to perform an attitude/rates data fusion processing operation, wherein the attitude data fusion algorithm module receives the first IAE result data and the second IAE result data, and performs an attitude/rates data fusion algorithm in a subsystem level to evaluate an attitude estimation IAE performance.

Thus, the satellite attitude data fusion system and method of the present invention performs an attitude/rates data fusion algorithm in a subsystem level by using less quantity of star trackers, for example, only one star tracker, a certain quantity of gyros, for example, two gyros, and a certain quantity of Extended Kalman Filters, for example, two Extended Kalman Filters to determine a better estimation of the spacecraft attitude data and evaluate a better attitude estimation IAE performance, wherein by using the first gyro and the second gyro of the MEMS as those two gyros, the sensor as a star tracker, and the first EKF and the second EKF of the GS IAE as those two EKFs, thus, a small and light weight spacecraft can be achieved, the low accuracy problem of small and light weight inertial sensors, for example, star trackers, of MEMS devices is solved, and the satellite attitude data fusion system and method of the present invention is suitable for use in the application of obtaining the attitude estimation IAE performance for the high-precision satellite attitude data.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein:

FIG. 4 is a table to illustrate the comparison of the attitude estimation IAE performance between an embodiment of the satellite attitude data fusion system of the present invention and the prior art.

DETAILED DESCRIPTION OF THE DISCLOSED EMBODIMENTS

Figure 1:
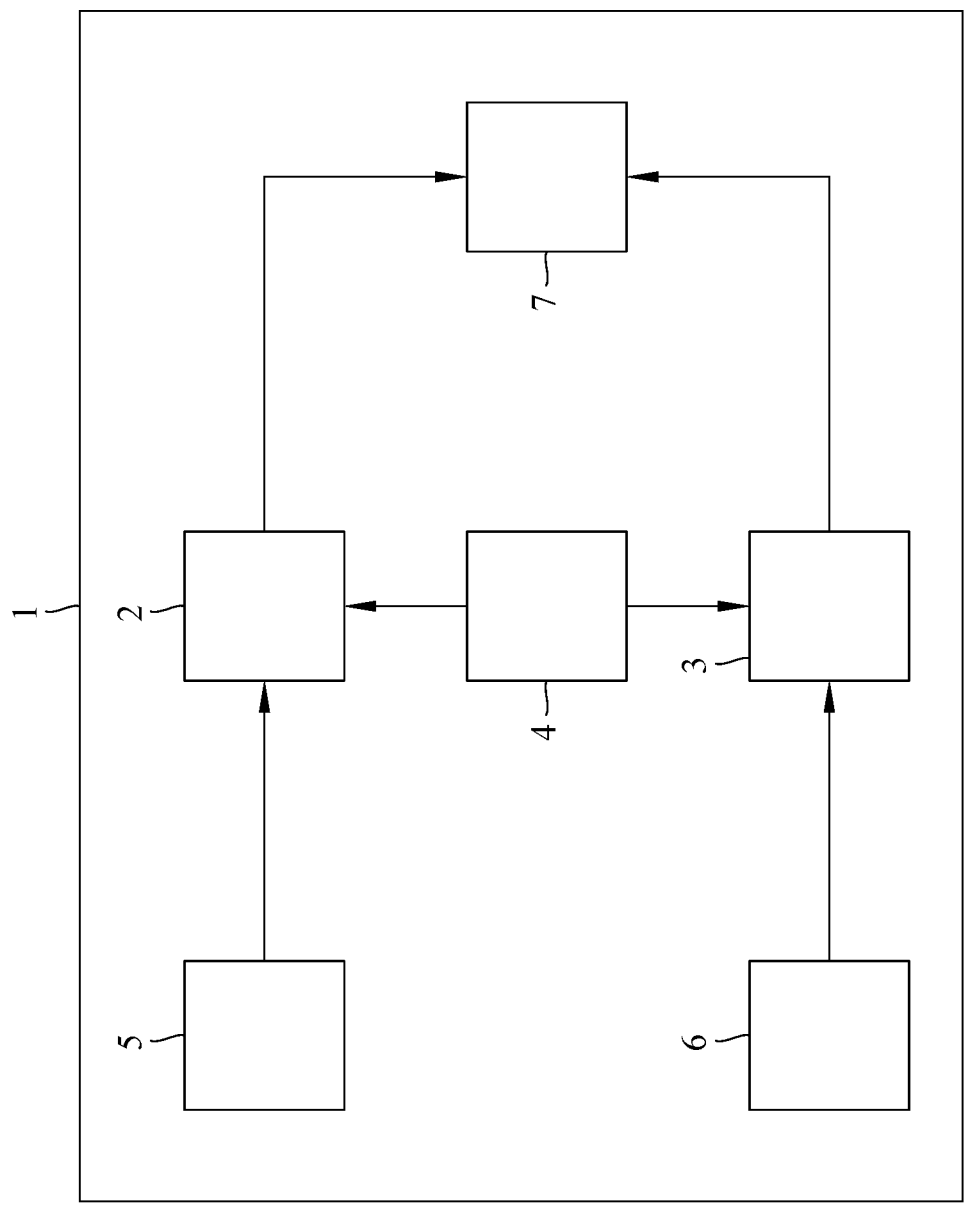
FIG. 1 is a schematic view to illustrate the structure of the satellite attitude data fusion system according to the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view to illustrate the structure of the satellite attitude data fusion system according to the present invention. As shown in FIG. 1, a satellite attitude data fusion system 1, comprising at least: a first EKF 2 and a second EKF 3 of a GS IAE, a sensor 4, a first gyro 5 and a second gyro 6 of a MEMS, and an attitude data fusion algorithm module 7.

The first EKF 2: the first EKF 2 of a GS IAE receives first gyro attitude data from the first gyro 5 of the MEMS, and sensor attitude data from the sensor 4, and performs an first algorithm based on the first gyro attitude data and the sensor attitude data to obtain first IAE (Inertial Attitude Estimate) result data and output it to an attitude data fusion algorithm module 7.

The second EKF 3: the second EKF 3 of the GS IAE receives second gyro attitude data from the second gyro 6 of the MEMS, and the sensor attitude data from the sensor 4, and performs an second algorithm based on the second gyro attitude data and the sensor attitude data to obtain second IAE (Inertial Attitude Estimate) result data and output it to the attitude data fusion algorithm module 7.

The attitude data fusion algorithm module 7: the attitude data fusion algorithm module 7 receives the first IAE result data and the second IAE result data, and performs an attitude/rates data fusion algorithm in a subsystem level to evaluate an attitude estimation IAE performance.

Figure 2:
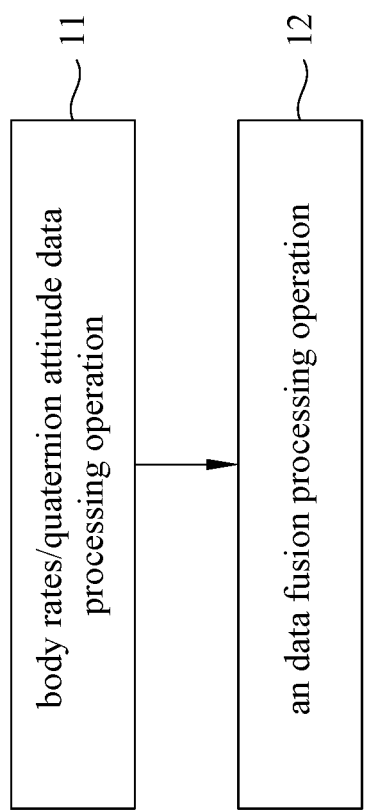
FIG. 2 is a flowchart to illustrate the satellite attitude data fusion method performed by the satellite attitude data fusion system according to the present invention.

FIG. 2 is a flowchart to illustrate the satellite attitude data fusion method performed by the satellite attitude data fusion system according to the present invention.

As shown in FIG. 2, step 11 is to perform a body rates/quaternion attitude data processing operation, wherein the first EKF 2 receives the first body rates data from the first gyro 5, and the quaternion attitude data from the sensor 4, and performs the first algorithm based on the first body rates data and the quaternion attitude data to obtain the first IAE result data and output it to the attitude data fusion algorithm module 7, and the first body rates data is first gyro attitude data of the first gyro 5 and the quaternion attitude data is sensor attitude data of the sensor 4, and wherein the second EKF 3 receives the second body rates data from the second gyro 6, and the quaternion attitude data from the sensor 4, and performs the second algorithm based on the second body rates data from the second gyro 6 and the quaternion attitude data from the sensor 4 to obtain second IAE result data and output it to the attitude data fusion algorithm module 7, and the second body rates data is second gyro attitude data of the second gyro 6 and the quaternion attitude data is the sensor attitude data of the sensor 4. Then, proceed to step 12.

Step 12 is to perform an attitude/rates data fusion processing operation, wherein the attitude data fusion algorithm module 7 receives the first IAE result data and the second IAE result data, and performs the attitude/rates data fusion algorithm in a subsystem level to evaluate an attitude estimation IAE performance.

Figure 3:
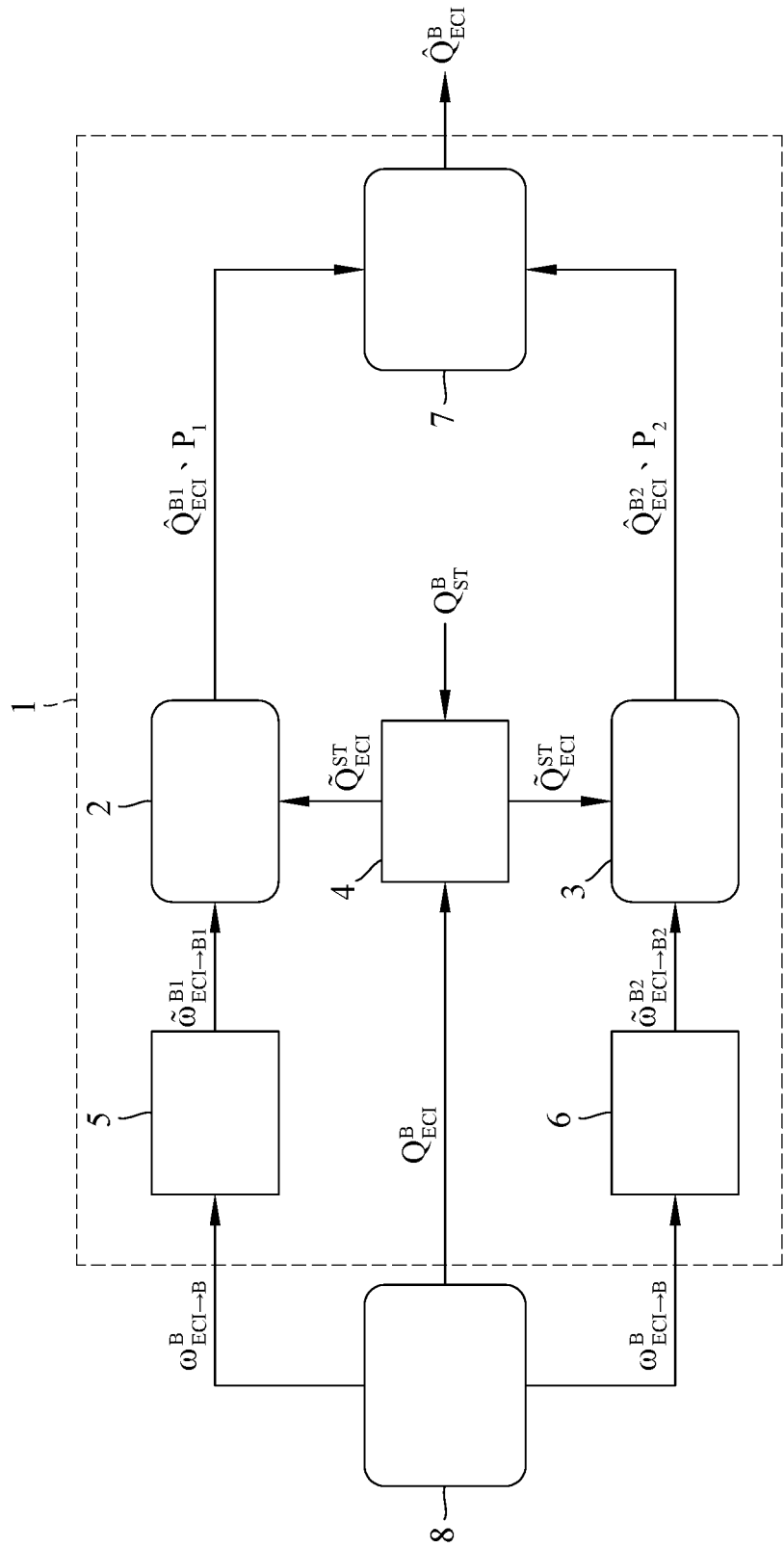
FIG. 3 is a schematic view to illustrate the structure and operation of the satellite attitude data fusion system according to an embodiment of the present invention.

FIG. 3 is a schematic view to illustrate the structure and operation of the satellite attitude data fusion system according to an embodiment of the present invention.

As shown in FIG. 3, a satellite attitude data fusion system 1 comprises at least: a first EKF 2 and a second EKF 3 of a GS IAE, a sensor 4, a first gyro 5 and a second gyro 6 of a MEMS, and an attitude data fusion algorithm module 7.

As shown in FIG. 3, the first gyro 5 and the second gyro of the MEMS receive body rates $\omega_{ECI \to B}^{B}$ from the spacecraft true dynamics system 8, wherein the body rates $\omega_{ECI \to B}^{B}$ are body rates converting from the ECI (Earth-Centered Inertial) frame coordinates to the spacecraft body frame coordinates.

The first gyro 5 receives and processes the body rates $\omega_{ECI \to B}^{B}$, and outputs first body rates data $\tilde{\omega}_{ECI \to B1}^{B1}$, wherein the first body rates data $\tilde{\omega}_{ECI \to B1}^{B1}$ are body rates converting from the ECI frame coordinates to the first gyro B1 in the spacecraft body frame coordinates, the first body rates data $\tilde{\omega}_{ECI \to B1}^{B1}$ is the first gyro attitude data of the first gyro 5, and the first gyro 5 can perform or not perform the misalignment correction process and output the first body rates data $\tilde{\omega}_{ECI \to B1}^{B1}$ depending on the actual application.

The second gyro 6 receives and processes the body rates $\omega_{ECI \to B}^{B}$, and outputs second body rates data $\tilde{\omega}_{ECI \to B2}^{B2}$, wherein the second body rates data $\tilde{\omega}_{ECI \to B2}^{B2}$ are body rates converting from the ECI frame coordinates to the second gyro B2 in the spacecraft body frame coordinates, the second body rates data $\tilde{\omega}_{ECI \to B2}^{B2}$ is the second gyro attitude data of the second gyro 6, and the second gyro 6 can perform or not perform the misalignment correction process and output the second body rates data $\tilde{\omega}_{ECI \to B2}^{B2}$ depending on the actual application.

The sensor 4 receives quaternion attitude data $Q_{ECI}^{B}$ and quaternion attitude data $Q_{ST}^{B}$ from the spacecraft true dynamics system 8, wherein the quaternion attitude data $Q_{ECI}^{B}$ is quaternion attitude data converting from the ECI (Earth-Centered Inertial) frame coordinates to the spacecraft body frame coordinates B, and the quaternion attitude data $Q_{ST}^{B}$ is quaternion attitude data converting from the star tracker of the spacecraft to the spacecraft body.

The sensor 4 processes the quaternion attitude data $Q_{ECI}^{B}$ and the quaternion attitude data $Q_{ST}^{B}$, and outputs quaternion attitude data $\tilde{Q}_{ECI}^{B}$ to the first EKF 2 and the second EKF 3, respectively, wherein the quaternion attitude data $\tilde{Q}_{ECI}^{B}$ is quaternion attitude data, and the sensor attitude data of the sensor 4.

The first EKF 2: the first EKF 2 of the GS IAE receives the first body rates data $\tilde{\omega}_{ECI \to B1}^{B1}$ (the first gyro attitude data) from the first gyro 5 of the MEMS, and the quaternion attitude data $\tilde{Q}_{ECI}^{B}$ (the sensor attitude data) from the sensor 4, and performs the first algorithm based on the first body rates data $\tilde{\omega}_{ECI \to B1}^{B1}$ (the first gyro attitude data) and the quaternion attitude data $\tilde{Q}_{ECI}^{B}$ (the sensor attitude data) to obtain first IAE result data $\hat{Q}_{ECI}^{B1}$, $P_1$ and output it to the attitude data fusion algorithm module 7.

The second EKF 3: the second EKF 3 of the GS IAE receives the second body rates data $\tilde{\omega}_{ECI \to B2}^{B2}$ (the second gyro attitude data) from the second gyro 6 of the MEMS, and the quaternion attitude data $\tilde{Q}_{ECI}^{B}$ (the sensor attitude data) from the sensor 4, and performs the second algorithm based on the second body rates data $\tilde{\omega}_{ECI \to B2}^{B2}$ (the second gyro attitude data) and the quaternion attitude data $\tilde{Q}_{ECI}^{B}$ (the sensor attitude data) to obtain second IAE result data $\hat{Q}_{ECI}^{2}$ $P_2$, and output it to the attitude data fusion algorithm module 7.

Meanwhile, the P1 and P2 are time varying parameters, and, however, an algorithm can be performed by using stability of the P1 and P2 parameters.

The attitude data fusion algorithm module 7: the attitude data fusion algorithm module 7 receives the first JAE result data $\hat{Q}_{ECI}^{B1}$, $P_1$ (the first JAE result data) and the second IAE result data $\hat{Q}_{ECI}^{B2}$ $P_2$, (the second IAE result data), and performs an attitude/rates data fusion algorithm in a subsystem level to perform the attitude/rates data fusion to evaluate an attitude estimation IAE performance and output the quaternion attitude data $\hat{Q}_{ECI}^{B}$.

FIG. 4 is a table to illustrate the comparison of the attitude estimation IAE performance between an embodiment of the satellite attitude data fusion system of the present invention and the prior art.

Hence, the one sigma attitude error can be approximated by:

$$\sigma_{\Delta\theta} = \sqrt{p_{11}} \approx \sqrt{rq_{11}} = \sqrt{r\left(\frac{1}{\sqrt{3}}\right)}\sigma_{arw} = 3^{-\frac{1}{4}}\sqrt{r\sigma_{arw}} = (0.76)\overline{\sigma}_{\Delta\theta}$$

where $\overline{\sigma}_{\Delta\theta}$ is the one sigma attitude error with one MEMS gyro array.

One sigma attitude errors in each axis using one IAE Approach will be reduced by a factor of $\frac{1}{3}^{1/4}$ (0.76) (in general will be by a factor of $1/N^{1/4}$ for N MEMS gyro arrays) as compared to $\frac{1}{3}^{1/2}$ (0.577) when one uses multiple IAEs Approach.

In FIG. 4, the present invention describes the Matlab models built to validate the IAE performance with two different approaches and assess their performance sensitivities to MEMS gyro angle random walks and misalignments among MEMS gyro arrays. As shown in FIG. 4, the table illustrates the IAE performance of different GS IAE configurations (TBU).

Three simulation cases are performed to evaluate the attitude estimation performance. The spacecraft attitude & body rates motion generated by the 6-DOF nonlinear, high-fidelity Micro-sat simulator. The Micro-sat's dynamics is well considered in this simulation scenario. The spacecraft is orientated to sun pointing (SUP Mode) when it exits the eclipse zone and switched to geocentric attitude pointing (GAP mode) when it enters the eclipse zone.

The spacecraft's attitude measurements are provided by the star tracker model, and rate measurements are provided by two MEMS gyro models.

The simulation parameters are given below:
star tracker model: accuracy: 55 arcsec, 1 sigma;
gyro model: ARW: 0.7 deg/hr(TBC), bias: 5 deg/hr(TBC); and
gyro misalignment angle (x, y, z) : (0.5, 0.2, 0.4) degree.

As for case 1, the standard configuration in the prior performs a GS (Gyro-Stellar) IAE (Inertial Attitude Estimate) algorithm to process satellite attitude data from star sensor and body rates from two gyros to evaluate the attitude estimation IAE performance.

As for case 2, a rate data fusion algorithm is used to process body rates from two gyros and obtain a operation result, and, then, a EKF of a GS IAE is used to process the operation result and spacecraft attitude data from a sensor to evaluate the attitude estimation IAE performance.

Meanwhile, case 3 uses the satellite attitude data fusion system and method of the present invention to evaluate the attitude estimation IAE performance.

Figure 5:
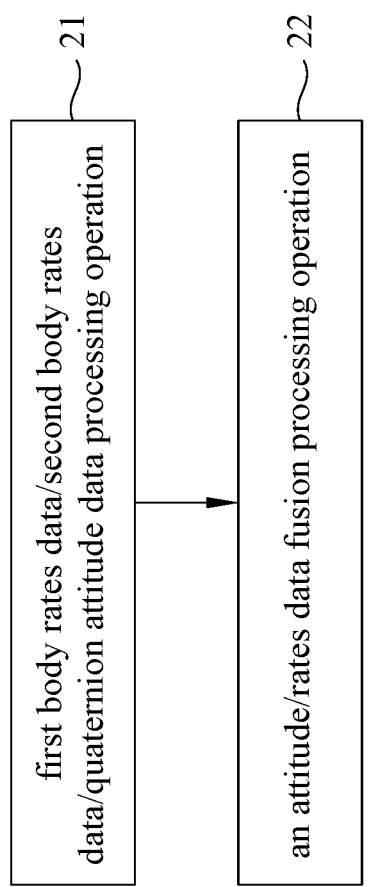
FIG. 5 is a flowchart showing the use of the satellite attitude data fusion system of an embodiment of the present invention in FIG. 3 to perform satellite attitude data fusion method.

FIG. 5 is a flowchart showing the use of the satellite attitude data fusion system of an embodiment of the present invention in FIG. 3 to perform satellite attitude data fusion method.

As shown in FIG. 5, step 21 is to perform a body rates/quaternion attitude data processing operation, wherein the first EKF 2 of the GS IAE receives the first body rates data $\tilde{\omega}_{ECI \to B1}^{B1}$ (the first gyro attitude data) from the first gyro 5 of the MEMS, and the quaternion attitude data $\tilde{Q}_{ECI}^{B}$ (the sensor attitude data) from the sensor 4, and performs the first algorithm based on the first body rates data $\tilde{\omega}_{ECI \to B1}^{B1}$ (the first gyro attitude data) and the quaternion attitude data $\tilde{Q}_{ECI}^{B}$ (the sensor attitude data) to obtain first IAE result data $\hat{Q}_{ECI}^{B1}$, $P_1$ and output it to the attitude data fusion algorithm module 7, and wherein the second EKF 3 of the GS IAE receives the second body rates data $\tilde{\omega}_{ECI \to B2}^{B2}$ (the second gyro attitude data) from the second gyro 6 of the MEMS, and the quaternion attitude data $\tilde{Q}_{ECI}^{B}$ (the sensor attitude data) from the sensor 4, and performs the second algorithm based on the second body rates data $\tilde{\omega}_{ECI \to B2}^{B2}$ (the second gyro attitude data) and the quaternion attitude data $\tilde{Q}_{ECI}^{B}$ (the sensor attitude data) to obtain second IAE result data $\hat{Q}_{ECI}^{B1}$ $P_2$, and output it to the attitude data fusion algorithm module 7. Then, proceed to step 22.

Step 22 is to perform an attitude/rates data fusion processing operation, wherein the attitude data fusion algorithm module 7 receives the first IAE result data $\hat{Q}_{ECI}^{B1}$, $P_1$ (the first IAE result data) and the second IAE result data $\hat{Q}_{ECI}^{B2}$ $P_2$, (the second IAE result data), and performs the attitude/rates data fusion algorithm in a subsystem level to perform the attitude/rates data fusion to evaluate an attitude estimation IAE performance and output the quaternion attitude data $\hat{Q}_{ECI}^{B}$.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A satellite attitude data fusion system, applicable to the earth satellite environment to estimate attitude data of the satellite, comprising:
    a first EKF of a GS IAE;
    a second EKF of the GS IAE;
    a sensor;
    a first gyro of a MEMS, wherein the first gyro of the MEMS is connected to the first EKF of the GS IAE;
    a second gyro of a MEMS, wherein the second gyro of the MEMS is connected to the second EKF of the GS IAE; and
    an attitude data fusion algorithm module,
    wherein an attitude data fusion algorithm module, wherein the first gyro and the second gyro of the MEMS are connected to the attitude data fusion algorithm module, respectively,
    wherein the first gyro and the second gyro of the MEMS are connected to the sensor, respectively,
    wherein the first gyro of the MEMS performs a misalignment correction process and output first body rates data,
    wherein the second gyro of the MEMS performs a misalignment correction process and output second body rates data,
    wherein, the first EKF, the second EKF, the sensor, the first gyro, and the second gyro are used to perform a body rates quaternion attitude data processing operation based on the first body rates data, the second body rates data, and the quaternion attitude data to obtain first IAE result data and second IAE result data, and the attitude data fusion algorithm module performs an attitude/rates data fusion algorithm in a subsystem level to evaluate an attitude estimation IAE performance based on the first IAE result data, and the second IAE result data, and
    wherein a first EKF of a GS IAE performs an first algorithm based on the first body rates data and the quaternion attitude data to obtain the first IAE result data, and a second EKF of the GS IAE performs an second algorithm based on the second body rates data and the quaternion attitude data to obtain the second IAE result data.

2. The satellite attitude data fusion system as claimed in claim 1, wherein the first EKF of the GS IAE performs an first algorithm based on the first body rates data and the quaternion attitude data to obtain the first IAE result data, and the second EKF of the GS IAE performs an second algorithm based on the second body rates data and the quaternion attitude data to obtain the second IAE result data.

* * * * *